United States Patent [19]

Tanaka

[11] Patent Number: 4,719,589
[45] Date of Patent: Jan. 12, 1988

[54] FLOATING-POINT ADDER CIRCUIT

[75] Inventor: Hideo Tanaka, Tokyo, Japan

[73] Assignee: NEC Corporation, Tokyo, Japan

[21] Appl. No.: 687,336

[22] Filed: Dec. 28, 1984

[30] Foreign Application Priority Data

Dec. 28, 1983 [JP] Japan ................... 58-247027

[51] Int. Cl.$^4$ .............. G06F 7/50; G06F 11/00
[52] U.S. Cl. ..................... 364/748; 364/737
[58] Field of Search ............ 364/748, 754, 768, 745, 364/737

[56] References Cited

U.S. PATENT DOCUMENTS

| | | | |
|---|---|---|---|
| 3,193,669 | 7/1965 | Voltin ................... | 364/748 |
| 4,511,990 | 4/1985 | Hagiwara et al. ......... | 364/748 |
| 4,562,553 | 12/1985 | Mattedi et al. ......... | 364/745 |
| 4,592,006 | 5/1986 | Hagiwara et al. ......... | 364/748 |

FOREIGN PATENT DOCUMENTS

| | | | |
|---|---|---|---|
| 32038 | 2/1984 | Japan ................... | 364/748 |
| 188740 | 10/1984 | Japan ................... | 364/748 |
| 171534 | 9/1985 | Japan ................... | 364/748 |
| 263230 | 12/1985 | Japan ................... | 364/748 |

OTHER PUBLICATIONS

Smith et al., "*Fixed-Point, Floating Point Adder*", Technical Notes No.: 846, RCA, Aug. 20, 1969, pp. 1-3.
Hayes, "*Computer Architecture and Organization*", 1978, pp. 208-209.
Baer, "*Computer Systems Architecture*", 1980, pp. 122-125.

*Primary Examiner*—Gary V. Harkcom
*Assistant Examiner*—Tan V. Mai
*Attorney, Agent, or Firm*—Sughrue, Mion, Zinn, Macpeak & Seas

[57] ABSTRACT

An arithmetic processing unit executes a first operation to adjust a scale of an exponent part of one data to that of the other data, a second operation to arithmetically calculate the mantissa parts of the two data according to a desired arithmetic operation, and a third operation to correct the exponent part according to the result of the calculation. The arithmetic unit includes an incrementer to increase the exponent part by +1 in parallel with the calculating operation without respect to an overflow resulting from said calculating operation, and a selector to select the output of the incrementer according to the result of the calculation. Therefore, these three operations can be performed at a high speed in only two cycles.

3 Claims, 3 Drawing Figures

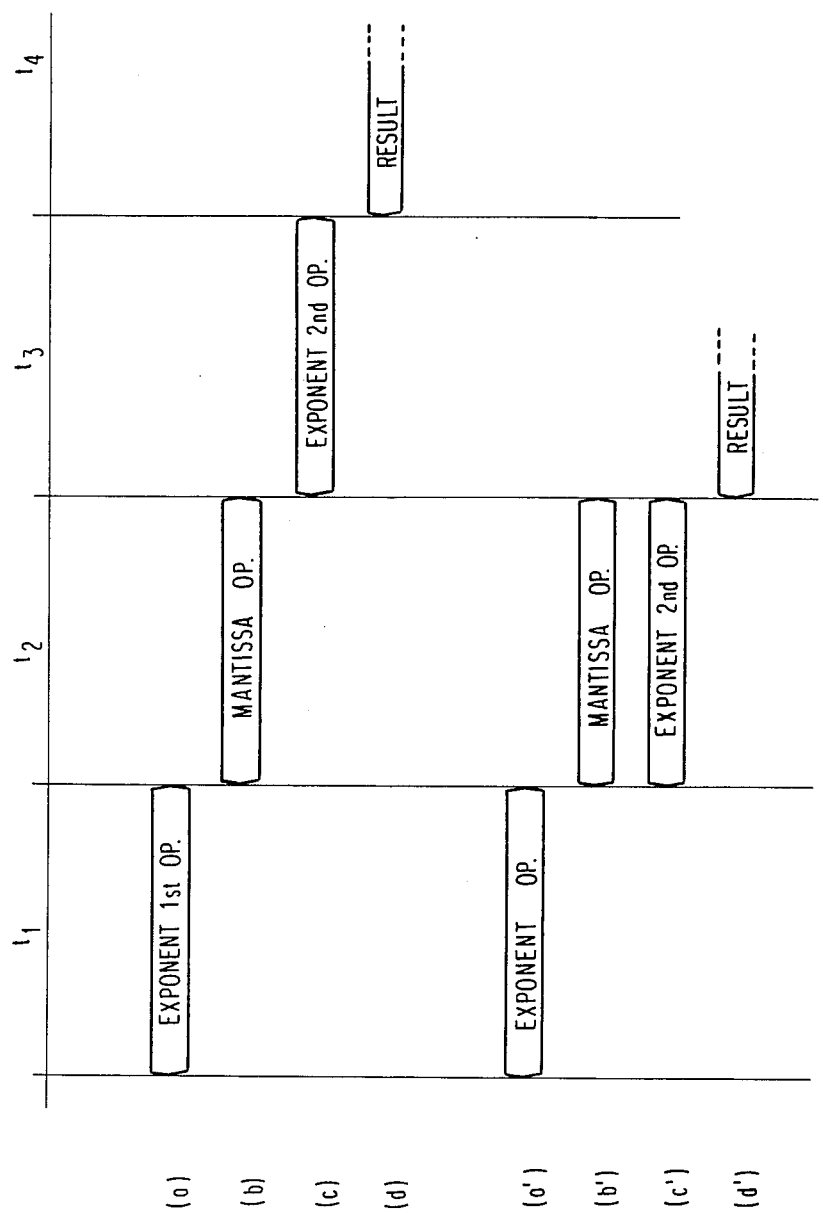

FLOATING-POINT ADDER CIRCUIT

BACKGROUND OF THE INVENTION

The present invention relates to an arithmetic processing unit, and more particularly to an arithmetic processing unit for processing floating point data.

A floating point data is represented by an exponent part and a mantissa part. That is, data A is represented by $M \times 2^E$ where E represents an exponent part and M indicates the mantissa part. When two floating point data are processed by an arithmetic unit, their exponent parts and mantissa parts are in general independently processed, respectively. However, when values of the two exponent parts are different from each other, an operation for adjusting the value of one exponent part with a small value to the value of the other exponent part with a large value is required. To execute this adjusting operation a comparison is made between these two exponent parts, and thereafter adjusting is effected. Of course in addition to the adjusting operation, an adjustment to the mantissa part with respect to the data of which the exponent part has been adjusted is also required. The adjustment to the mantissa part can be performed by a bit shift operation. Thereafter, an arithmetic calculation of the two mantissa parts is performed. Here, if an overflow (or an underflow) arises in the calculation, a readjustment to the exponent part is required. For example, in the addition, a carry signal representing an overflow is generated from an adder. The exponent part is incremented by 1 according to the carry signal. In a conventional arithmetic processing unit, a result of an arithmetic operation is obtained after the second adjustment to the exponent part has been terminated.

As described above, the conventional arithmetic unit requires at least three different operations: one is a first adjustment operation of the exponent parts for adjusting a scale of one exponent part to that of the other exponent part; another operation is an arithmetic calculating operation of the mantissa parts; and the other operation is a second adjustment operation of an exponent part according to the arithmetic calculation of the mantissa parts. These three operations must be sequentially executed along a time axis, because the second operation is dependent on the result of the first operation and the third operation is dependent on the result of the second operation. Therefore, at least three operation cycles are necessarily required, so that a high speed processing can not be effected.

The conventional arithmetic processor carries out the third operation (the second adjustment operation) required to deal with an overflow (or an underflow) after the second operation (the arithmetic operation of the mantissa parts) has been completed. According to this operation flow, the additional time for the third operation is necessarily required. Therefore, no matter how speedily the arithmetic calculating operation (the second operation) may be performed with respect to the mantissa parts, a long period of time must be spent to complete the third operation (the second adjustment operation), resulting disadvantageously in a reduction also in a floating point data processing efficiency as a whole.

SUMMARY OF THE INVENTION

An object of the present invention is to provide an arithmetic processing unit which can perform a floating point arithmetic operation at a high speed.

Another object of the present invention is to provide an arithmetic processing unit suitable to application where a high-speed calculation is required.

An arithmetic processing unit of the present invention includes a first circuit for executing a first adjustment operation with respect to two exponent parts of two floating point data, a second circuit for executing an arithmetic calculating operation of two mantissa parts of the two floating data, a third circuit for executing an increment operation of an exponent part when the arithmetic operation of the mantissa parts is executed by the second circuit, and a fourth circuit for selecting either one of the exponent part which represents a data before the increment operation is executed or the exponent part which represents a data after the increment operation is executed by the third circuit according to the result of the arithmetic calculating operation of the second circuit.

According to the present invention the increment operation, which is executed after the arithmetic calculating operation in the prior art, is executed in parallel with the arithmetic calculating operation by the third circuit. The output, that is the incremented exponent part, of the third circuit is selected by the fourth circuit only when an overflow arises in the result of the arithmetic calculating operation executed by the second circuit. When the overflow does not arise, the output of the third circuit is not selected. Instead of the output of the third circuit, the output of the first circuit is selected. This selecting operation can be performed at a high speed according to a carry signal transferred from the second circuit. Therefore, a result of an arithmetic calculation can be obtained in two operation cycles according to the present invention, because the third cycle of the prior art in which the increment operation is executed according to the carry signal is not required. Thus, a floating point arithmetic operation can be performed at a high speed according to the present invention.

DESCRIPTION OF THE DRAWINGS

FIG. 3 is a timing chart showing an operation flow of the arithmetic processing units in FIGS. 1 and 2.

DESCRIPTION OF THE PREFERRED EMBODIMENT

Figure 2:
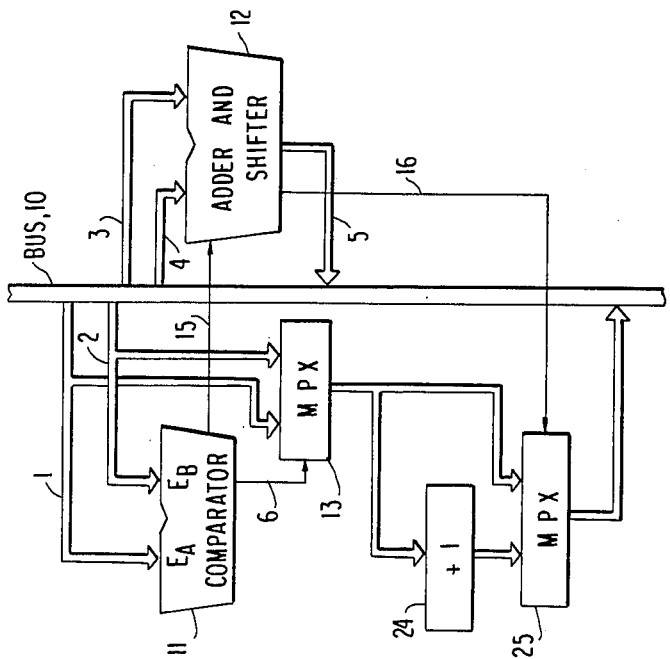
FIG. 2 is a block diagram showing a principal part of an improved arithmetic processing unit according to the present invention.

At first, the prior art arithmetic unit will be described by referring to FIG. 1. Two floating point data A and B are transferred to an arithmetic unit through a bus 10, respectively. An exponent part $E_A$ of the data A is applied at one input end of a comparator 11 through a line 1, while an exponent part $E_B$ of the data B is applied at the other input end of the comparator 11 through a line 2. The comparator 11 is used to execute a first adjustment operation with respect to the two exponent parts $E_A$ and $E_B$. The comparator 11 executes a subtraction of $E_A$ and $E_B$, and generates a selecting signal 6. The selecting signal 6 is applied to a multiplexer 13 to which the two exponent parts $E_A$ and $E_B$ are received, respectively. The multiplexer 13 selects either one of the received exponent parts. In general, an exponent part representing a larger value is selected and is set in an incrementer 14. The comparator 11 sends a data 15 representing a number of rightwardly shifting of a bit string in the mantissa part of the data having a non-selected exponent part to an adder and shifter 12. The adder and shifter 12 execute a shift operation according to the data 15 to modify a mantissa part of the data having a small value. Thereafter, an addition is started in the adder and shifter 12 which receives two mantissa parts at its input ends through lines 3 and 4, respectively. The adder and shifter 12 generate a carry signal 16 when an overflow occurs in the addition. The carry signal 16 is applied to the incrementer 14 after terminating the addition. The incrementer 14 can stop the operation that increments the exponent part by 1 according to the occurrence of the carry signal 16. Thus, a second adjustment operation is performed by the incrementer 14. The adjusted exponent part and the mantissa part derived from the adder and shifter 12 are transferred to the bus 10 through lines 7 and 5, respectively.

As above described, the prior art arithmetic unit requires at least three operations which are performed in series along a time axis to execute a floating point operation. It will be clearly understood that at least three subsequent cycles are spent in the prior art.

In contrast, according to the embodiment of the present invention shown in FIG. 2, a floating point operation can be executed in only two cycles. In FIG. 2 an arithmetic unit includes the comparator 11 coupled to the bus 10 via the lines 1 and 2, the adder and shifter 12 coupled to the bus 10 via lines 3, 4 and 5, and the multiplexer 13 receiving the exponent parts $E_A$ and $E_B$ and selecting the exponent part having a larger value according to the signal 6. These elements and their operations are the same as that of the prior art shown in FIG. 1. The unit of FIG. 2 further includes an incrementer 24 coupled to the multiplexer 13 and a selector 25 coupled to the multiplexer 13 and the incrementer 24. The selector 25 selects either one of the outputs of the multiplexer 13 and the incrementer 24 according to the carry signal 16. When the carry signal 16 is applied to the selector 25, that is for example a "1" level signal is applied, the output of the incrementer 24 is selected. This output corresponds to the output of the incrementer 14 (FIG. 1) which is derived when the carry signal 16 (FIG. 1) occurs. While, when the carry signal 16 (FIG. 2) is not generated by the adder and shifter 12, that is for example a "0" level signal is applied, the output of the multiplexer 13 is selected. The incrementer 24 may be used as same as the incrementer 13 of FIG. 1. Further a multiplexer may be used as the selector 25.

In the arithmetic unit, it is important to provide the incrementer 24 in advance of the selector 25. Thus, the increment operation which is executed after the carry signal has been applied to the incrementer 14 in FIG. 1 can be executed in parallel with the shifting and adding operations in the adder and shifter 12 without waiting reception of the carry signal. In other words, the incremented exponent part has been preliminarily prepared before the carry signal 16 is applied to the selector 25. That is, the second adjustment operation can be simultaneously performed with the arithmetic calculating operation for the mantissa parts. Therefore, a floating point operation can be executed at a high speed in only two cycles.

A more detailed procedure of data A and B to be added is as follows:
step (1) The respective exponent parts of the data A and B are input to the comparator 11.
step (2) The respective mantissa parts of the data A and B are input to the adder and shifter 12.
step (3) Subtraction of the exponent parts is executed in the comparator 11 for the first adjustment.
step (4) Either one of the exponent parts is selected by the multiplexer 13 according to the signal (e.g. borrow signal) 6.
step (5) Shifting and adding of the mantissa parts are carried out in the adder and shifter 12. The shifting is performed according to the data 15 representing the number of bits to be shifted. At the same time, the value of the exponent part selected by the multiplexer 13 is incremented by +1 in the incrementer 24.
step (6) The outputs of the multiplexer 13 and the incrementer 24 are applied to the selector 25.
step (7) The multiplexer 25 selects either one of the two outputs according to the carry signal 16 generated by the adder and shifter 12. The output of the multiplexer 24 is selected when the carry signal 16 is present, while the output of the multiplexer 13 is selected when the carry signal 16 is absent.

In the abovedescribed steps (1) to (7), the steps (1) to (4) are executed as the first operation in a first cycle. The remainder steps (5) to (7) are executed as the second and the third operations in a second cycle.

Figure 1:
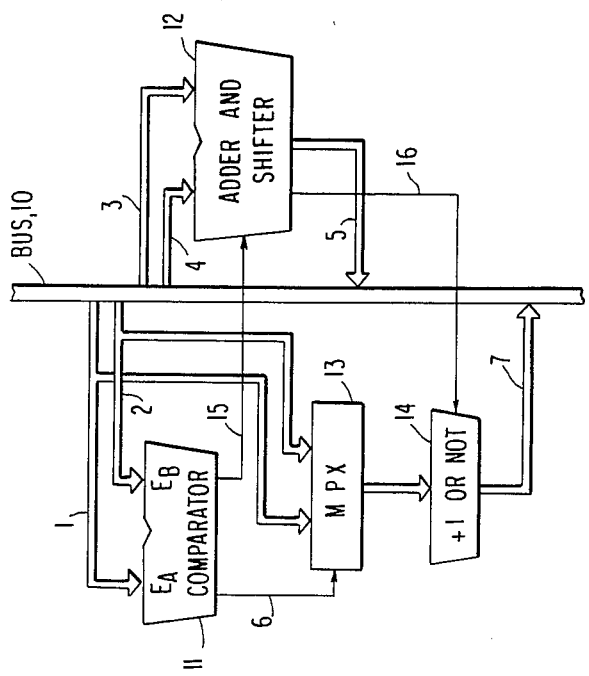
FIG. 1 is a block diagram showing a principal part of an arithmetic processing unit of the prior art.

FIGS. 3(a–d) and (a'–d') show timing charts for the units shown in FIGS. 1 and 2, respectively. FIG. 3(a) to FIG. 3(d) illustrates the operations of the prior art arithmetic processing unit of FIG. 1, and FIG. 3(a') to FIG. 3(d') illustrates the operations of the embodiment of FIG. 2. As shown in FIG. 3, the first adjustment operation (the first operation: EXPONENT 1st OP.), the arithmetic calculating operation (the second operation: MANTISSA OP.) and the second adjustment operation (the third operation: EXPONENT 2nd OP.) are sequentially executed in the cycles t1, t2 and t3 in the prior art. Thereafter, the result of the arithmetic operation is produced in a cycle t4.

In contrast, according to the present invention, the first adjustment operation is peformed in the first cycle t1. However, the arithmetic calculating operation and the second adjustment (correcting) is performed in the second cycle t2. Thus the result of the arithmetic operation can be produced in the third cycle.

It is easily understood that the present invention can be applied to a subtraction, a multiplication and a division as well as the abovedescribed addition. Further, the respective operations of the comparator 11 and the incrementer 24 may be executed in a time-division manner by the same circuit with adding and subtracting functions.

What is claimed is:

1. An arithmetic processing unit executing a floating point arithmetic operation of two floating point data, each of said two floating point data having an exponent part and a mantissa part, said processing unit comprising:
a first circuit means for receiving the respective exponent parts of said two floating point data, for performing a comparison operation between said two exponent parts and for selecting either one of said two exponent parts according to the comparison operation, a second circuit means for receiving the respective mantissa parts of said two floating point data and for arithmetically calculating the two mantissa parts, said second circuit means generating a carry signal, a third circuit means for receiving an exponent part selected by said first circuit means and, every time said second circuit means arithmetically calculates said two mantissa parts, simultaneously adding 1 to the selected exponent part, and a fourth circuit means coupled to said first, second and third circuit means, for selecting an added exponent part when a carry signal is applied thereto from said second circuit means and for selecting the selected exponent part as it is when the carry signal is not applied thereto from said second circuit means.

2. An arithmetic processing unit as claimed in claim 1, wherein said second circuit means applies said carry signal to said fourth circuit means only when an overflow occurs in an arithmetic calculation.

3. An arithmetic processing unit comprising:

a comparator for comparing a scale of an exponent part of a first floating point data with that of an exponent part of a second floating point data, a multiplexer coupled to said comparator and for selecting either one of the two exponent parts of said first and second floating point data according to a result of said comparison, an arithmetic circuit for receiving mantissa parts of said first and second floating point data, respectively, and for executing an arithmetic operation of the two mantissa parts, an incrementer coupled to said comparator, said incrementer incrementing a selected exponent part by 1 in advance when the arithmetic operation is executed by said arithmetic circuit and before a carry signal is generated, and a selector coupled to said incrementer, said multiplexer and said arithmetic circuit, for selecting an output of said incrementer when said arithmetic circuit applies a carry signal to said selector, and for selecting an output of said multiplexer when said arithmetic circuit does not apply the carry signal to said selector.

* * * * *

UNITED STATES PATENT AND TRADEMARK OFFICE
CERTIFICATE OF CORRECTION

PATENT NO. : 4,719,589

DATED : January 12, 1988

INVENTOR(S) : TANAKA

It is certified that error appears in the above-identified patent and that said Letters Patent is hereby corrected as shown below:

COLUMN 4, LINE 24  Delete "multiplexer 24" and insert --incrementer 24--

COLUMN 4, LINE 45  Delete "is peformed" and insert --are performed--

Signed and Sealed this

Second Day of August, 1988

Attest:

DONALD J. QUIGG

Attesting Officer     Commissioner of Patents and Trademarks